(12) United States Patent
Bastami (10) Patent No.: US 9,450,648 B2
(45) Date of Patent: Sep. 20, 2016

(54) APPARATUS, SYSTEM, AND METHOD FOR DETECTING A FOREIGN OBJECT IN AN INDUCTIVE WIRELESS POWER TRANSFER SYSTEM

(75) Inventor: Siamak Bastami, Gilroy, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 717 days.

(21) Appl. No.: 13/272,774

(22) Filed: Oct. 13, 2011

(65) Prior Publication Data

US 2013/0094598 A1 Apr. 18, 2013

(51) Int. Cl.
| | |
|---|---|
| H02J 7/00 | (2006.01) |
| H04B 5/00 | (2006.01) |
| H02J 5/00 | (2016.01) |
| H02J 17/00 | (2006.01) |
| H02J 7/02 | (2016.01) |

(52) U.S. Cl.
CPC .............. *H04B 5/0037* (2013.01); *H02J 5/005* (2013.01); *H02J 17/00* (2013.01); *H02J 7/025* (2013.01); *H04B 5/0081* (2013.01)

(58) Field of Classification Search
CPC ....................................................... H02J 5/005
USPC ....... 340/540; 324/207.15–207.19, 239–243, 324/256–258; 320/108; 307/104
See application file for complete search history.

(56) References Cited

U.S. PATENT DOCUMENTS

| | | |
|---|---|---|
| 7,310,245 B2 | 12/2007 | Ohbo |
| 2006/0049903 A1 | 3/2006 | Wolfgram |
| 2007/0228833 A1 | 10/2007 | Stevens et al. |
| 2008/0197802 A1* | 8/2008 | Onishi ..................... H02J 5/005 320/106 |
| 2009/0026844 A1 | 1/2009 | Iisaka et al. |
| 2009/0224723 A1 | 9/2009 | Tanabe |
| 2009/0322280 A1* | 12/2009 | Kamijo et al. ................ 320/108 |
| 2010/0007307 A1 | 1/2010 | Baarman et al. |

(Continued)

FOREIGN PATENT DOCUMENTS

| | | | |
|---|---|---|---|
| GB | 2414121 A | * 11/2005 | .............. H02J 5/005 |
| JP | 2009-219177 A | 9/2009 | |

(Continued)

OTHER PUBLICATIONS

PCT International Search Report and Written Opinion of the International Searching Authority for PCT/US2012/060264, dated Mar. 28, 2013, 9 pages.

(Continued)

*Primary Examiner* — Drew A Dunn
*Assistant Examiner* — Zixuan Zhou
(74) *Attorney, Agent, or Firm* — Haynes and Boone LLP (57) ABSTRACT

An inductive wireless power transfer system comprises a transmitter configured to generate wireless power signal to a coupling region in response to an input signal. The inductive wireless power transfer system's control logic is configured to determine an input power of the input signal. The control logic is configured to determine a presence of a foreign object within the coupling region in response to a comparison of the input power and an output power of an output signal of a receiver within the coupling region. Related inductive wireless power transfer systems and methods for detecting a foreign object in an inductive wireless power transfer coupling region of an inductive wireless power transfer system are disclosed.

22 Claims, 4 Drawing Sheets

(56) References Cited

U.S. PATENT DOCUMENTS

| | | | |
|---|---|---|---|
| 2010/0073177 A1* | 3/2010 | Azancot | H02J 5/005 340/657 |
| 2010/0084918 A1 | 4/2010 | Fells et al. | |
| 2010/0123430 A1* | 5/2010 | Kojima | H02J 7/025 320/108 |
| 2011/0181473 A1 | 7/2011 | Sulkowski, Jr. et al. | |
| 2011/0196544 A1* | 8/2011 | Baarman et al. | 700/291 |
| 2012/0001493 A1 | 1/2012 | Kudo et al. | |
| 2012/0146576 A1* | 6/2012 | Partovi | 320/108 |
| 2012/0149301 A1 | 6/2012 | Wiley | |
| 2012/0153740 A1 | 6/2012 | Soar | |
| 2013/0026981 A1 | 1/2013 | Van Der Lee | |
| 2013/0154554 A1 | 6/2013 | Sakai et al. | |

FOREIGN PATENT DOCUMENTS

| | | |
|---|---|---|
| JP | 2010-119251 A | 5/2010 |
| JP | 2011-507481 A | 3/2011 |
| JP | 201183094 | 4/2011 |
| WO | 2009081115 | 7/2009 |

OTHER PUBLICATIONS

"Toto Sakioto", "Theoretical and empirical comparison of coupling coefficient and refractive index estimation for coupled waveguide fiber", Journal of applied science & engineering technology 2008, <<http://library.rit.edu/oajournals/index.php/%EE%80%80jaset%EE%80%81/article/viewFile/127/133>>.

International preliminary Report on Patentability for PCT/US2012/060264 mailed Apr. 24, 2014, 1 page.

* cited by examiner

APPARATUS, SYSTEM, AND METHOD FOR DETECTING A FOREIGN OBJECT IN AN INDUCTIVE WIRELESS POWER TRANSFER SYSTEM

CROSS-REFERENCE TO RELATED APPLICATION

This application is related to co-pending U.S. patent application Ser. No. 13/272,774, filed Oct. 13, 2011 entitled "Apparatus, System, and Method for Detecting a Foreign Object in an Inductive Wireless Power Transfer System." This application is also related to co-pending U.S. patent application Ser. No. 13/436,309, filed Mar. 30, 2012, which is entitled "Apparatus, System, and Method for Detecting a Foreign Object in an Inductive Wireless Power Transfer System Based on Input Power."

TECHNICAL FIELD

Embodiments of the present disclosure relate generally to inductive wireless power transfer and, more particularly, to apparatuses, systems, and methods related to detecting foreign objects present during inductive wireless power transfer.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coil is one method considered as an untethered method for transferring power wirelessly through coupled electromagnetic field. In inductive wireless power transmission, power is transferred by transmitting an electromagnetic field through a transmit coil. On the receiver side, a receiver coil may couple with the transmit coil through the electromagnetic field, thus, receiving the transmitted power wirelessly. The distance between the transmitter and receiver coils at which efficient energy transfer can take place, is a function of a coupling coefficient between the coils. The coupling efficiency may be significantly improved if the coils are sized and operated at such a frequency that they are physically within the so-called "near-field zone" of each other. During power transfer from the transmitter to the receiver, a foreign object may be present within the near-field zone.

BRIEF SUMMARY

Embodiments of the present invention include an inductive wireless power transfer device. The inductive wireless power transfer device comprises a transmitter and control logic. The transmitter is configured to generate an electromagnetic field to a coupling region in response to an input signal. The control logic is configured to determine an input power of the input signal. The control logic is further configured to determine a presence of a foreign object within the coupling region in response to a comparison of the input power and an output power of an output signal of a receiver within the coupling region.

Another embodiment of the present disclosure includes an inductive wireless power transfer system. The inductive wireless power transfer system comprises an inductive wireless power transfer apparatus configured to generate an electromagnetic field in a coupling region for wireless power transfer, and a wireless power receiving apparatus configured to couple with the electromagnetic field and generate an output signal in response thereto. At least one of the inductive wireless power transfer apparatus and the inductive wireless power receiving apparatus is configured to determine a presence of a foreign object within the coupling region based, at least in part, on monitoring an input power of the wireless power charging apparatus and an output power of the wireless power receiving apparatus.

In yet another embodiment of the present disclosure, a method for detecting a foreign object in an inductive wireless power coupling region of a wireless power transfer system is disclosed. The method comprises determining an input power of a transmitter of an inductive wireless power transfer system, determining an output power of a receiver of an inductive wireless power transfer system, determining a foreign object power loss based, at least in part, on a difference between the input power and the output power, and determining the presence of a foreign object in an inductive wireless power coupling region when the foreign object power loss is greater than a predetermined threshold.

DETAILED DESCRIPTION

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Figure 1A:
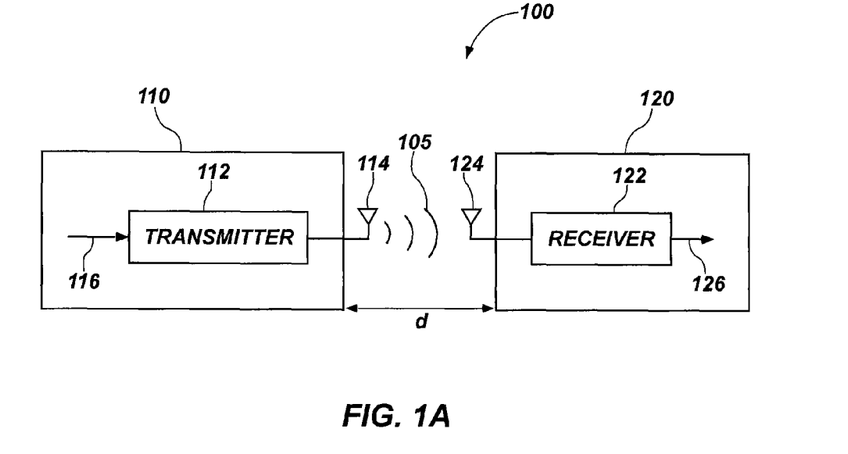
FIG. 1A is a schematic block diagram of an inductive wireless power transfer system.

FIG. 1A is a schematic block diagram of an inductive wireless power transfer system 100. The inductive wireless power transfer system 100 includes a wireless power charger 110, and a wireless power receiving device 120. The wireless power charger 110 includes a transmitter 112 coupled with a transmit coil 114 configured to generate an electromagnetic field 105 for providing energy transfer to the wireless power receiving device 120. The wireless power receiving device 120 includes a receiver 122 coupled with a receive coil 124 configured to couple with the electromagnetic field 105. The transmit coil 114 and the receive coil 124 may be sized according to the particular devices and applications to be associated therewith.

An input signal 116 is provided to the transmitter 112 for providing the transmitter 112 with the power for generating the electromagnetic field 105 that provides an energy transfer to the wireless power receiving device 120. The receiver 122 couples to the electromagnetic field 105 and generates an output signal 126 in response thereto. The output signal 126 may provide the power that is used by the wireless power receiving device 120 for storing (e.g., charging a battery), consumption (e.g., providing system power), or both.

The transmitter 112 and the receiver 122 are separated by a distance (d). In some embodiments, the transmitter 112 and the receiver 122 may be configured according to a mutual inductance relationship, such that when the resonant frequency of the receiver 122 and the resonant frequency of the transmitter 112 are substantially identical, transmission losses between the transmitter 112 and the receiver 122 are minimal. In other words, an efficient energy transfer occurs by coupling a large portion of the energy in the near-field of the transmit coil 114 to the receive coil 124 rather than propagating most of the energy in an electromagnetic wave to the far-field. If the wireless power receiving device 120 is in the near-field, a coupling mode may be developed between the transmit coil 114 and the receive coil 124. The area around the transmit coil 114 and receive coil 124 where this near-field coupling may occur may be referred to as a coupling region.

The wireless power receiving device 120 may be a mobile electronic device such as a cell phone, smart phone, media player (e.g., mp3 player), electronic reader, tablet, personal digital assistant (PDA), camera, laptop computer, and personal electronic device in which wireless power may be received. The wireless power receiving device 120 may also be a less mobile electronic device, such as a television, personal computer, media player (e.g., DVD player, Blu-ray player, etc.) or any other device that may run off of, or store electrical power. The wireless power receiving device 120 may be one of a number of other items, such as an automobile or any other devices that may include batteries that may be charged through the wireless power charger 110.

Figure 1B:
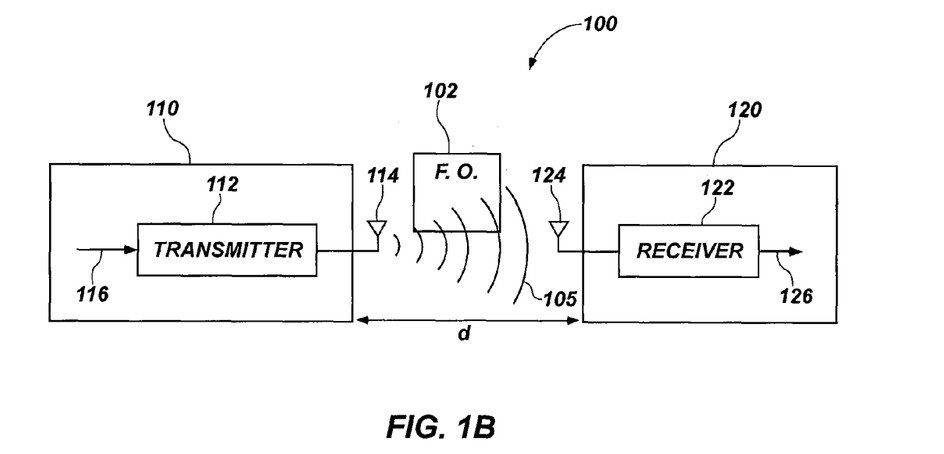
FIG. 1B is the inductive wireless power transfer system having a foreign object present within the electromagnetic field.

As shown in FIG. 1B, the inductive wireless power transfer system 100 may have a foreign object (F.O.) 102 present within the coupling region of the electromagnetic field 105. Of course, there may be more than one foreign object 102 present. The presence of the foreign object 102 may cause problems for the inductive wireless power transfer system 100. For example, if the foreign object 102 has a sufficiently strong metallization, the foreign object 102 may receive at least some of the energy during wireless power transfer from the transmitter 112 to the receiver 122. In other words, the foreign object 102 may steal at least a portion of the energy of the electromagnetic field 105 that is intended for the wireless power receiving device 120. As a result, the foreign object 102 may reduce the energy that the wireless power receiving device 120 receives, which may result in a reduced level of power transfer. In addition, the foreign object 102 may convert the received energy to heat. The heat generated by the foreign object 102 may cause problems such as melting materials that are part of or near the foreign object 102, and may further create fire and other hazardous conditions to the inductive wireless power transfer system 100 as well as to the user (e.g., burn potential if contacted).

Embodiments of the present disclosure include the inductive wireless power transfer system 100 being configured to detect the presence of the foreign object 102 within the coupling region of the inductive wireless power transfer system 100. In other words, the inductive wireless power transfer system 100 may be configured to detect the foreign object 102 located within the electromagnetic field 105 between the transmitter 112 and the receiver 122. In response to detecting the foreign object 102, the inductive wireless power transfer system 100 may reduce or disable generation of the electromagnetic field 105. For example, the inductive wireless power transfer system 100 may disable the transmitter 112. In some embodiments, the inductive wireless power transfer system 100 may reduce the transmitting power of the transmitter 112 to reduce the potential for a hazardous condition of the foreign object 102 without completely stopping the charging of the wireless power receiving device 120.

Figure 2:
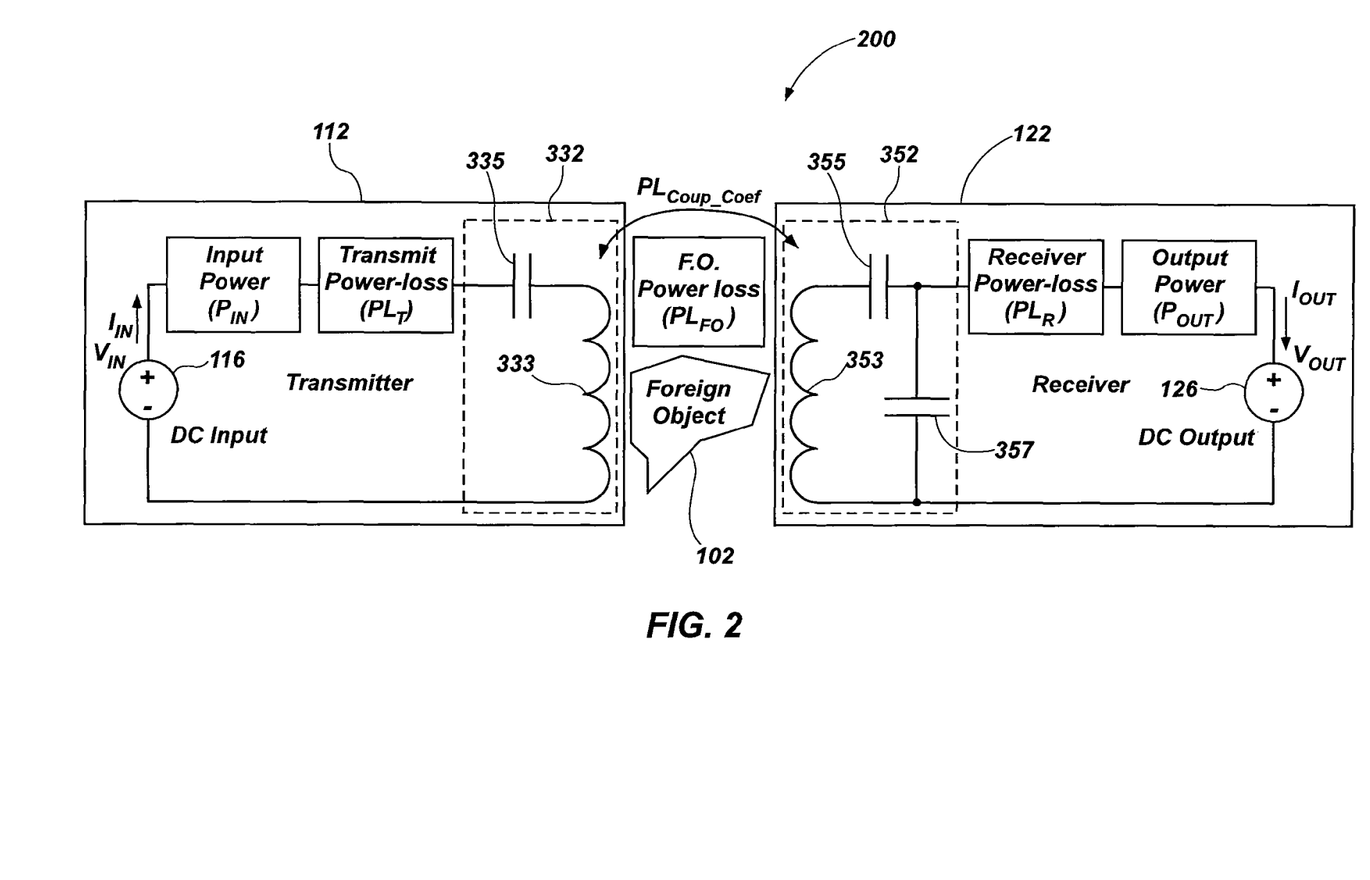
FIG. 2 is a schematic power distribution breakdown for an inductive wireless power transfer system according to an embodiment of the present disclosure.

FIG. 2 is a schematic power distribution breakdown for an inductive wireless power transfer system 200 according to an embodiment of the present disclosure. The inductive wireless power transfer system 200 includes the transmitter 112 and the receiver 122. The transmitter 112 and the receiver 122 may be included within a wireless power charger 110 (FIG. 1A) and a wireless power receiving device 120 (FIG. 1A) as discussed above.

Figure 3:
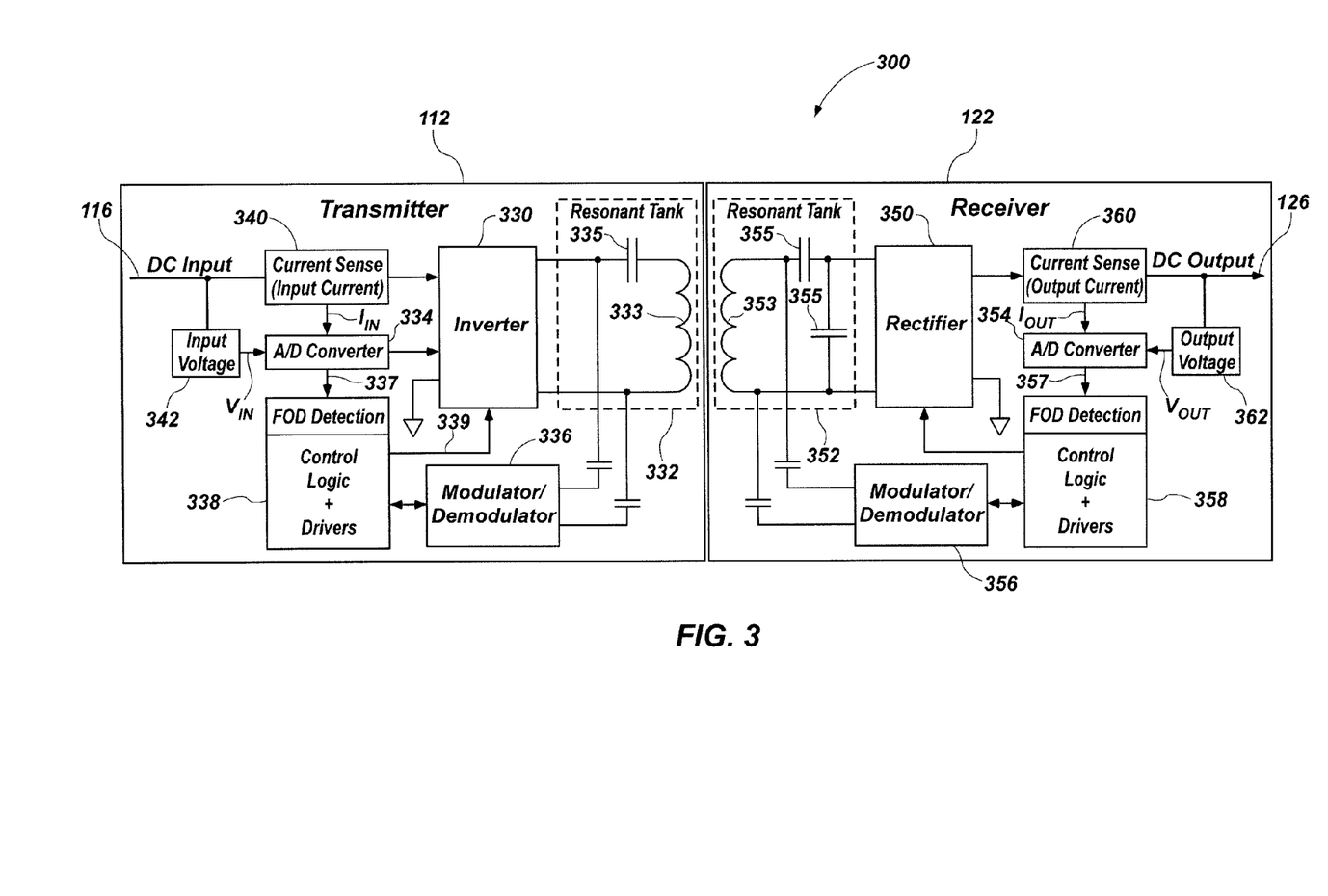
FIG. 3 is a schematic block diagram of an inductive wireless power transfer system according to an embodiment of the present disclosure.

The transmitter 112 is powered by the input signal 116 (e.g., DC input). The input signal 116 provides the transmitter 112 with an input voltage ($V_{IN}$) and an input current ($I_{IN}$). The input voltage ($V_{IN}$) and the input current ($I_{IN}$) may be measured through a voltage sense element 342 (FIG. 3) and a current sense element 340 (FIG. 3). In the transmitter 112, the input power ($P_{IN}$) is calculated based, at least in part, on the input voltage ($V_{IN}$) and the input current ($I_{IN}$). For example, $P_{IN}=V_{IN} \times I_{IN}$. There may be known power losses within the components of the transmitter 112 while the transmitter 112 receives the input signal 116 and generates the electromagnetic field 105 (FIG. 1A) as the wireless power signal. The known (i.e., estimated or measured) power losses within the components of the transmitter 112 may be referred to as the transmitter power loss ($PL_T$).

The receiver 122 is configured to generate an output signal 126 (e.g., DC output). The output signal 126 has an output power ($P_{OUT}$). The output power ($P_{OUT}$) may be determined by measuring the output current ($I_{OUT}$) and the output voltage ($V_{OUT}$). In other words, $P_{OUT}=V_{OUT} \times I_{OUT}$. There may be known power losses within the components of the receiver 122 while the receiver 122 receives the electromagnetic field 105 and generates the output signal 126. The known power losses within the components of the receiver 122 may be referred to as the receiver power loss ($PL_R$).

In addition, there may be additional power loss associated with the coupling of the electromagnetic field 105 from inductors 333, 353 and other components within a transmit resonant tank 332 (FIG. 3) and a receiver resonant tank 352 (FIG. 3). This additional power loss may be referred to as the coupling coefficient power loss ($PL_{Coup\_Coef}$).

Thus, the system power loss ($PL_{SYSTEM}$) in the inductive wireless power transfer system 200 may be the power loss attributed to the inductive wireless power transfer system 200 itself. In other words, $PL_{SYSTEM}=PL_T+PL_{Coup\_Coef}+PL_R$, where $PL_T$, $PL_{Coup\_Coef}$ and $PL_R$ are understood based on the efficiency/loss coefficients in the inductive wireless power transfer system 200. In general, the system power loss ($PL_{SYSTEM}$) may be calculated by measuring the input power ($P_{IN}$) and the output power ($P_{OUT}$) when there is no foreign object 102 in the field between transmitter 112 and the receiver 126. Thus, $PL_{SYSTEM}=P_{IN}-P_{OUT}$ when there is no foreign object 102 present.

If a foreign object 102 is present, the foreign object 102 may absorb power that creates additional power loss in the inductive wireless power transfer system 200. For example, the foreign object 102 may include a conductive material that may absorb power from the electromagnetic field 105. The power loss attributed to the foreign object 102 may be called the foreign object power loss ($PL_{FO}$). As a result, the total power loss ($P_{TOTAL}$) may include the sum of the total system power loss ($P_{SYSTEM}$) and the foreign object power loss ($PL_{FO}$). In other words, $P_{TOTAL}=PL_{SYSTEM}+PL_R$). If solving for the foreign object power loss ($PL_{FO}$), $PL_{FO}=PL_{TOTAL}-PL_{SYSTEM}$. Therefore, $PL_{FO}=P_{IN}-P_{OUT}-P_{SYSTEM}$. Therefore, $PL_{FO}=P_{IN}-P_{OUT}-PL_T-PL_{Coup\_Coef}-PL_R$. Because the system power loss ($P_{SYSTEM}$) may be a known value based on the characteristics of the inductive wireless power transfer system 200, the inductive wireless power transfer system 200 may monitor the input power ($P_{IN}$) of the transmitter 112 and the output power ($P_{OUT}$) of the receiver 122 in order to determine the foreign object power loss ($PL_{FO}$). From the foreign object power loss ($PL_{FO}$), the inductive wireless power transfer system 200 may determine that there is a foreign object 102 within the electromagnetic field 105 of the inductive wireless power transfer system 200. For example, if the foreign object power loss exceeds a predetermined threshold (e.g., 10% of the input power), the inductive wireless power transfer system 200 may determine that the foreign object 102 is present. As a result, the inductive wireless power system 200 may take action, such as alerting the user of the foreign object, reducing the power of the transmitter 112, eliminating the transmission of the electromagnetic field 105, or combinations thereof.

FIG. 3 is a schematic block diagram of an inductive wireless power system 300 according to an embodiment of the present disclosure. In the inductive wireless power transfer system 300 may be configured to identify the foreign object 102 (FIG. 2) and take actions in response thereto (e.g., alarming the user, reducing transmitting power, etc.). The inductive wireless power transfer system 300 may include the transmitter 112 and the receiver 122. The transmitter 112 and the receiver 122 may be configured as described above, in that the transmitter 112 may generate the electromagnetic field 105 (FIG. 1A) to which the receiver 122 may couple, such as through inductive coupling between inductors 333, 353. The receiver 122 may be configured to generate the output power 126 in response to being coupled to the electromagnetic field 105.

The transmitter 112 includes an inverter 330, a transmit resonant tank 332, an analog-to-digital (A/D) converter 334, a modulator/demodulator 336 and control logic 338. The transmit resonant tank 332 is operably coupled with the inverter 330 and the modulator/demodulator 336. The control logic 338 is operably coupled with the A/D converter 334, the inverter 330 and the modulator/demodulator 336.

The inverter 330 and the transmit resonant tank 332 convert the input signal 116 (a DC signal) to an AC signal that can be used to transmit the electromagnetic field 105 (FIG. 1A) to the receiver 122. The transmit resonant tank 332 includes an inductor 333 coupled with an output capacitor 335. As current flows through the coils of the inductor 333, the electromagnetic field 105 is generated. The coils of the inductor 333 may have a resonant frequency that may be tuned based on the inductance of the coils of the inductor 333 and the capacitance of the plates of the output capacitor 335.

The current sense element 340 is configured to determine (e.g., sense) the input current ($I_{IN}$) into the transmitter 112 of the inductive wireless power transfer system 300. The current sense element 340 may be a stand-alone element or function; however, in some embodiments the current sense element 340 may be integrated with other elements or functions described herein.

The voltage sense element 342 is configured to determine (e.g., sense) the input voltage ($V_{IN}$) into the transmitter 112 of the inductive wireless power transfer system 300. The voltage sense element 342 may be a stand-alone element or function; however, in some embodiments the voltage sense element 342 may be integrated with other elements or functions described herein.

The A/D converter 334 receives the input voltage ($V_{IN}$) and the input current ($I_{IN}$). The A/D converter 334 is configured to digitize the input voltage ($V_{IN}$) and input current ($I_{IN}$) and send digitized data 337 to the control logic 338.

The control logic 338 may include a processor (e.g., microprocessor) and other peripherals (e.g., memory). Memory may include non-volatile memory (e.g., ROM) and volatile memory (e.g., RAM). The control logic 338 receives the digitized data 337 representing the input current ($I_{IN}$) and the input voltage ($V_{IN}$). With the digitized data 337, the control logic 338 is configured to calculate the input power ($P_{IN}$) for the inductive wireless power transfer system 300.

The receiver 122 includes a rectifier 350, a receiver resonant tank 352, an analog-to-digital (A/D) converter 354, modulator/demodulator 356, and control logic 358. The receiver resonant tank 352 is operably coupled with the rectifier 350 and the modulator/demodulator 356. The control logic 358 is operably coupled with the A/D converter 354, the rectifier 350 and the modulator/demodulator 356.

The receiver resonant tank 352 includes an inductor 353 coupled with capacitors 355. As the electromagnetic field 105 is received by the receiver 122, current is generated and flows through the coils of the inductor 353 in the receiver resonant tank 352. The resonant frequency of the receiver resonant tank 352 may be based on the inductance of the coils of the inductor 353 and the capacitance of the plates of the capacitors 355. If the resonant frequencies of the resonant tanks 332, 352 are substantially the same, the coupling efficiency and wireless power transfer may be improved.

The receiver resonant tank 352 and the rectifier 350 generate the current (an AC signal) by coupling with the electromagnetic field 105 and convert that AC signal to the output signal 126 (a DC signal). The output signal 126 may be used to power an electronic device, charge an energy storage device (e.g., a battery), or both.

A current sense element 360 is configured to determine (e.g., sense) the output current ($I_{OUT}$) generated by the receiver 122 the inductive wireless power transfer system 300. The current sense element 340 may be a stand-alone element or function; however, in some embodiments the current sense element 360 may be integrated with other elements or functions described herein.

The voltage sense element 362 is configured to determine (e.g., sense) the output voltage ($V_{OUT}$) generated by the receiver 122 of the inductive wireless power transfer system 300. The voltage sense element 362 may be a stand-alone element or function; however, in some embodiments the voltage sense element 362 may be integrated with other elements or functions described herein.

The A/D converter 354 receives the output voltage ($V_{OUT}$) and the output current ($I_{OUT}$). The A/D converter 354 is configured to digitize the output voltage ($V_{OUT}$) and output current ($I_{OUT}$) and send digitized data 357 to the control logic 358.

The control logic 358 may include a processor (e.g., microprocessor) and other peripherals (e.g., memory). Memory may include non-volatile memory (e.g., ROM) and volatile memory (e.g., RAM). The control logic 358 receives the digitized data 357 representing the output current ($I_{OUT}$) and the output voltage ($V_{OUT}$). With the digitized data 357, the control logic 358 is configured to calculate the output power ($P_{OUT}$) for the inductive wireless power transfer system 300.

The modulator/demodulators 336, 356 are configured to communicate data between the transmitter 112 and the receiver 122. For example, the modulator/demodulator 356 of the receiver 122 may transmit data over a communication link to the transmitter 112. The data may include the digitized data 357 representing the output power of the output signal 126 generated by the receiver 122. In some embodiments, the transmitter 112 may transmit data to the receiver 122 over a communication link, such as sharing the input power ($P_{OUT}$) of the input signal 116.

In some embodiments, the digitized data 357 communicated between the receiver 122 and the transmitter 112 may be the power data (i.e., digitized input power ($P_{OUT}$) or digitized output power ($P_{OUT}$)). For example, the digitized output power ($P_{OUT}$) may be calculated by the control logic 358 of the receiver 122, and sent to the transmitter 112. In some embodiments, the digitized data 357 communicated between the receiver 122 and the transmitter 112 may be the voltage data (i.e., digitized input voltage ($V_{IN}$) or digitized output voltage ($V_{OUT}$)) and the current data (i.e., digitized input current ($I_{IN}$) or digitized output current ($I_{OUT}$)) individually. For example, the digitized output voltage ($V_{OUT}$) and the digitized output current ($I_{OUT}$) may be sent to the transmitter 312, and the control logic 338 of the transmitter 112 may perform the calculation to determine the output power ($P_{OUT}$).

The inductive wireless power transfer system 300 is configured to detect the presence of the foreign object 102 (FIG. 2), based, at least in part, on a comparison of the input power of the transmitter 112 and the output power of the receiver 122. For example, the inductive wireless power transfer system 300 may determine that the foreign object 102 is present when the difference between the input power ($P_{IN}$) and the output power ($P_{OUT}$) is greater than a predetermined threshold. The inductive wireless power transfer system 300 may further take into account assumed normal power loss due to inefficiencies in the inductive wireless power transfer system 300. For example, the wireless power transfer system 300 may further take into account power losses such as the transmitter power loss ($PL_T$), the coupling coefficient power loss ($PL_{Coup\_Coef}$), and the receiver power loss ($PL_R$) as discussed above with respect to FIG. 2.

In operation, the input power ($P_{IN}$) is determined by monitoring the input voltage ($V_{IN}$) and input current ($I_{IN}$) of the transmitter 112. For example, the input voltage ($V_{IN}$) and the input current ($I_{IN}$) may be sensed by the voltage sense element 342 and the current sense element 340, and digitized by the A/D converter 354. The digitized data 337 may be sent to and stored in the control logic 338 as a transmit power for the transmitter 112.

The output power ($P_{OUT}$) is determined by monitoring the output voltage ($V_{OUT}$) and the output current ($I_{OUT}$) of the receiver 122. For example, the output voltage ($V_{OUT}$) and the output current ($I_{OUT}$) may be sensed by the voltage sense element 362 and the current sense element 360, and digitized by the A/D converter 354. The digitized data 357 may be sent to and stored in the control logic 358 as a receive power for the receiver 122. The digitized data 357 may further be sent from the receiver 122 to the transmitter 112 through modulator/demodulators 356, 336.

The transmitter 112 may receive the receive power from the receiver 122. The control logic 338 of the transmitter 112 may compare the input power ($P_{IN}$) and the output power ($P_{OUT}$) to determine if the foreign object 102 is present. For example, the control logic 338 may determine that the foreign object 102 is present if the power loss between the input power ($P_{IN}$) and the output power ($P_{OUT}$) is greater than a predetermined threshold. The predetermined threshold may include known losses due to inefficiencies of the inductive wireless power transfer system 300. For example, the transmitter power loss ($PL_T$) may be known (i.e., estimated) and stored in the control logic 338. The receiver power loss ($PL_R$) may be known (i.e., estimated) and stored in the control logic 358. The coupling coefficient loss ($PL_{Coup\_Coef}$) may be stored in either the control logic 338 or control logic 358. The transmitter power loss ($PL_T$), the receiver power loss ($PL_R$), the coupling coefficient loss ($PL_{Coup\_Coef}$), may be stored as a percentage of power loss relative to the input power ($P_{IN}$). Although data is described herein as being stored at a particular location, data may be stored by either the transmitter 112 or the receiver 122. Likewise, calculations may be performed by either the transmitter 112 or the receiver 122. The data and results of the calculations may be freely shared by communication links between the transmitter 112 and the receiver 122.

The transmitter 112 may determine a foreign object power loss ($PL_{FO}$). If the transmitter 112 determines that the foreign object power loss ($PL_{FO}$) is above a predetermined threshold, the transmitter 112 may take actions in response thereto. For example, the transmitter 112 may alert the user that the foreign object 102 is present and should be removed. Such an alert may include sounding an alarm, displaying a message on a display, or performing another method of notification to the user. The transmitter 112 may reduce the strength of the electromagnetic field 105 or disable the generation thereof to reduce or stop the wireless power transfer from the transmitter 112 to the receiver 122. For example, the control logic 338 may generate a foreign object detect interrupt signal 339 to the inverter 330 that controls the operation thereof. Different thresholds may exist that result in different actions taken by the transmitter 112. For example, the transmitter 112 may reduce the strength of the electromagnetic field 105 if the foreign object power loss ($PL_{FO}$) is above a first threshold (e.g., 10%) but below a second threshold (e.g., 20%). The transmitter may stop transmission of the electromagnetic field 105 if the foreign object power loss ($PL_{FO}$) is above the second threshold (e.g., 20%).

Figure 4:
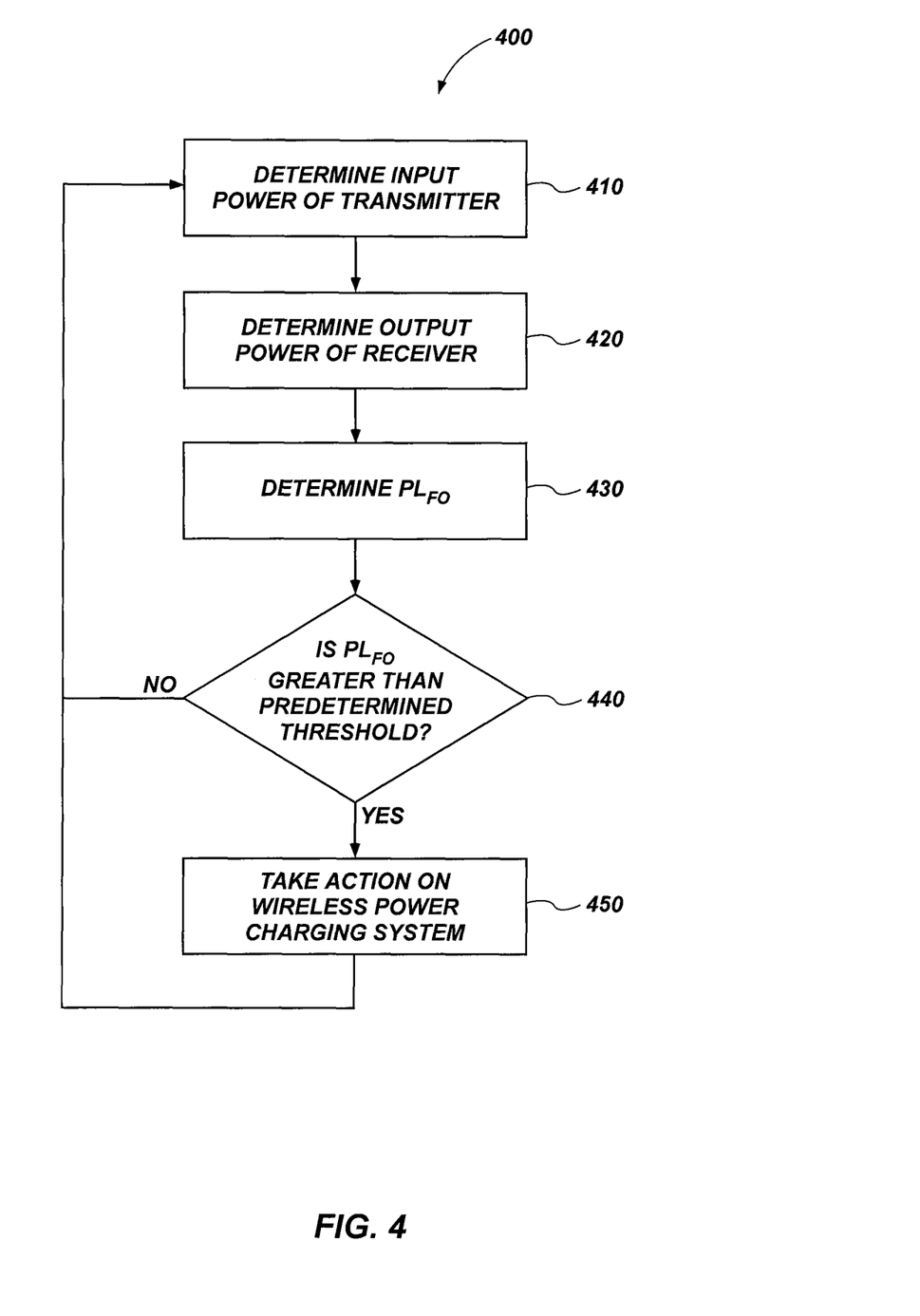
FIG. 4 is a flowchart illustrating a method for detecting a foreign object in an inductive coupling region of an inductive wireless power transfer system according to an embodiment of the present disclosure.

FIG. 4 is a flowchart 400 illustrating a method for detecting a foreign object in a coupling region of a inductive wireless power transfer system according to an embodiment of the present disclosure. At operation 410, the input power of the transmitter may be determined. The input power may be determined by sensing the input voltage and the input current of the input signal of the transmitter. For example, the input voltage and the input current may be digitized and multiplied to determine the input power. The input power may be stored as data within the transmitter.

At operation 420, the output power of the receiver may be determined. The output power may be determined by sensing the output voltage and the output current of the output signal of the receiver. For example, the output voltage and the output current may be digitized and multiplied to determine the output power. The output power may be stored as data within the receiver. In some embodiments, the output power may be transmitted as data to the transmitter through a communication link, and stored by the transmitter.

At operation 430, the foreign object power loss ($PL_{FO}$) may be determined. For example, the foreign object power loss ($PL_{FO}$) may based, at least in part, on a difference between the input power and the output power. In some embodiments, the foreign object power loss ($PL_{FO}$) may be further based on additional estimated power losses within the inductive wireless power transfer system.

At operation 440, the foreign object power loss ($PL_{FO}$) may be compared to a predetermined threshold. If the foreign object power loss ($PL_{FO}$) is not greater than the predetermined threshold, it may be determined that the foreign object is not present and the input power and output power may continue to be monitored. If the foreign object power loss ($PL_{FO}$) is greater than the predetermined threshold, it may be determined that the foreign object is present.

At operation 450, action may be taken on the inductive wireless power transfer system in response to the determination that the foreign object is present in the coupling region. For example, the transmitter may reduce the strength of the electromagnetic field generated, completely stop generation of the electromagnetic field, alert the user to remove the foreign object from the coupling region, or combinations thereof. It is further contemplated that other remedial actions may be taken.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An inductive wireless power transfer device, comprising:
    a transmitter configured to transfer power to a receiver in a coupling region by generating a wireless power signal in the coupling region in response to an input signal;
    a current sensor configured to measure a direct current (DC) current of the input signal;
    a voltage sensor configured to measure a DC voltage of the input signal; and
    control logic coupled to the current and voltage sensors and configured to:

determine, based on the measured DC current and DC voltage of the input signal, an input power of the input signal while power is being transferred to the receiver via the wireless power signal;

determine a transmitter power loss of the transmitter;

determine a receiver power loss of the receiver;

determine an output power of an output signal at the receiver based on information received from the receiver;

determine a coupling coefficient power loss in the coupling region between the transmitter and the receiver;

determine a foreign object power loss based on the input power, the transmitter power loss, the receiver power loss, the output power, and the coupling coefficient power loss;

determine a presence of a foreign object within the coupling region based on the foreign object power loss;

reduce a strength of the wireless power signal when the foreign object power loss is above a first predetermined threshold and below a second predetermined threshold; and stop generating the wireless power signal when the foreign object power loss is above the second predetermined threshold.

2. The inductive wireless power transfer device of claim 1, wherein the control logic determines that the foreign object is present within the coupling region when the foreign object power loss is above a third predetermined threshold.

3. The inductive wireless power transfer device of claim 2, wherein the third predetermined threshold for the foreign object power loss is defined in the control logic as a percentage of power loss relative to the input power.

4. The inductive wireless power transfer device of claim 2, wherein the third predetermined threshold for the foreign object power loss is defined in the control logic as a difference between the input power and the output power adjusted for the transmitter power loss, the receiver loss, and the coupling coefficient loss.

5. The inductive wireless power transfer device of claim 1, wherein each of the transmitter power loss, the receiver power loss, and the coupling coefficient power loss are known percentage values stored in at least one of the control logic of the transmitter and control logic of the receiver.

6. The inductive wireless power transfer device of claim 2, wherein the first predetermined threshold matches the third predetermined threshold.

7. The inductive wireless power transfer device of claim 2, wherein the second predetermined threshold matches the third predetermined threshold.

8. The inductive wireless power transfer device of claim 1, wherein the control logic is further configured to notify a user that the foreign object is present within the coupling region.

9. An inductive wireless power transfer system, comprising:

a wireless power transmitting apparatus configured to generate a wireless power signal in a coupling region for wireless power transfer in response to an input signal; and a wireless power receiving apparatus configured to couple with the wireless power signal and generate an output signal in response thereto, wherein at least one of the wireless power transmitting apparatus and the wireless power receiving apparatus is configured to determine a presence of a foreign object within the coupling region based, at least in part, by:

determining an input power of the wireless power transmitting apparatus;

determining a transmitter power loss of the wireless power transmitting apparatus;

determining a receiver power loss of the wireless power receiving apparatus;

determining an output power of the wireless power receiving apparatus;

determining a coupling coefficient power loss in the coupling region between the wireless power transmitting apparatus and the wireless power receiving apparatus;

determining a foreign object power loss based on the input power, the transmitter power loss, the receiver power loss, the output power, and the coupling coefficient power loss;

determining the presence of the foreign object based on the foreign object power loss;

reducing a strength of the wireless power signal when the foreign object power loss is above a first predetermined threshold and below a second predetermined threshold; and stopping generation of the wireless power signal when the foreign object power loss is above the second predetermined threshold;

wherein determining at least one of the input power and the output power includes determining a direct current (DC) current and DC voltage of a corresponding at least one of the input signal and the output signal during wireless power transfer between the wireless power transmitting apparatus and the wireless power receiving apparatus.

10. The inductive wireless power transfer system of claim 9, wherein the wireless power receiving apparatus includes a mobile electronic device.

11. The inductive wireless power transfer system of claim 9, wherein the wireless power receiving apparatus is configured to send digitized data representing the output power to the wireless power transmitting apparatus over a communication link.

12. The inductive wireless power transfer system of claim 9, wherein each of the wireless power transmitting apparatus and the wireless power receiving apparatus includes a resonant tank that has a substantially similar resonant frequency.

13. The inductive wireless power transfer system of claim 9, wherein each of the wireless power transmitting apparatus and the wireless power receiving apparatus includes control logic configured to calculate and store the respective input power and the output power.

14. The inductive wireless power transfer system of claim 13, wherein the control logic for each of the wireless power transmitting apparatus and the wireless power receiving apparatus is further configured to store power loss information regarding the respective apparatus.

15. A method for detecting a foreign object in an inductive wireless power transfer coupling region of an inductive wireless power transfer system, the method comprising:

determining a direct current (DC) current and DC voltage of an input signal of the inductive wireless transfer system during normal operation of the inductive wireless transfer system;

determining input power of a transmitter of an inductive wireless power transfer system based on the DC current and DC voltage of the input signal;

determining output power of a receiver of an inductive wireless power transfer system;

determining a transmitter power loss of the transmitter;

determining a receiver power loss of the receiver;

determining a coupling coefficient power loss in the coupling region;

determining a foreign object power loss based, at least in part, on the input power, the transmitter power loss, the receiver power loss, the output power, and the coupling coefficient power loss;

determining a presence of a foreign object in the coupling region when the foreign object power loss is greater than a first predetermined threshold;

reducing wireless power transfer when the foreign object power loss is above a second predetermined threshold and below a third predetermined threshold; and disabling wireless power transfer when the foreign object power loss is above the third predetermined threshold.

16. The method of claim 15, wherein determining the input power includes sensing an input voltage and an input current of the transmitter to determine the input power, and storing digitized data representing the input power in control logic of the transmitter.

17. The method of claim 15, wherein determining the output power includes sensing an output voltage and an output current of the receiver to determine the output power, and sending digitized data representing the output power from the receiver to the transmitter.

18. The method of claim 15, wherein the first, second and third predetermined thresholds are defined in the control logic as being a percentage of the input power.

19. The method of claim 15, further comprising taking an action on the inductive wireless power transfer system in response to the determination of the presence of the foreign object.

20. The inductive wireless power transfer device of claim 1, wherein the coupling coefficient power loss is stored in the control logic.

21. The inductive wireless power transfer system of claim 9, wherein:

the wireless power transmitting apparatus includes a current sense element and a voltage sense element configured to sense the DC current and DC voltage of the input signal, respectively, during wireless power transfer; and the wireless power receiving apparatus includes a current sense element and a voltage sense element configured to sense the DC current and DC voltage of the output signal, respectively, during wireless power transfer.

22. The inductive wireless power transfer device of claim 1, wherein to determine the coupling coefficient power loss the control logic is configured to determine a difference between the input power and the output power when no foreign object is present in the coupling region and subtract out the transmitter power loss and the receiver power loss.

* * * * *